United States Patent [19]

Inoue et al.

[11] Patent Number: 5,217,603
[45] Date of Patent: Jun. 8, 1993

[54] HYDROTREATMENT PROCESS

[75] Inventors: Yoshimasa Inoue, Matsudo; Naoyuki Torihara; Syuhei Manabe, both of Niihama; Kenichi Kawamoto, Niihama; Yoshimitsu Miyauchi, Noda; Katsuhisa Fujita, Koganei, all of Japan

[73] Assignee: Akzo N.V., Netherlands

[21] Appl. No.: 523,159

[22] Filed: May 14, 1990

[30] Foreign Application Priority Data

May 22, 1989 [JP] Japan .................. 1-126786

[51] Int. Cl.$^5$ .................. C10G 23/00
[52] U.S. Cl. .................. 208/251 H; 208/251 R; 208/307; 208/177; 208/264
[58] Field of Search .................. 208/251 H, 177

[56] References Cited

U.S. PATENT DOCUMENTS

| | | | |
|---|---|---|---|
| 2,910,434 | 10/1959 | Hess et al. | 208/251 H |
| 3,876,533 | 4/1975 | Myers | 208/251 H |
| 3,947,347 | 3/1976 | Mitchell | 208/251 H |
| 4,053,391 | 10/1977 | Paraskos et al. | 208/251 H |
| 4,159,241 | 6/1979 | Simo | 208/251 H |
| 4,227,995 | 10/1980 | Sze et al. | 208/251 H |
| 4,431,525 | 2/1984 | Hensley et al. | 208/251 H |
| 4,450,068 | 5/1984 | Kukes | 208/251 H |
| 4,486,295 | 12/1984 | Inooka | 208/251 H |
| 4,510,263 | 4/1985 | Pereira et al. | 502/314 |

FOREIGN PATENT DOCUMENTS

| | | |
|---|---|---|
| 89793 | 4/1987 | Japan . |
| 1298905 | 3/1967 | United Kingdom . |
| 2108003 | 2/1971 | United Kingdom . |

Primary Examiner—Helane E. Myers
Attorney, Agent, or Firm—James K. Poole; Louis A. Morris

[57] ABSTRACT

A process for hydrotreating a hydrocarbon oil contaminated with suspended solid particles and dissolved metallic compounds, comprising the contacting of the oil at an elevated temperature in the presence of hydrogen with porous inorganic oxide particles having a surface area of 1 m$^2$/g or less and a pore volume of at least 0.1 ml/g in pores having a diameter of at least 10 microns.

11 Claims, 3 Drawing Sheets

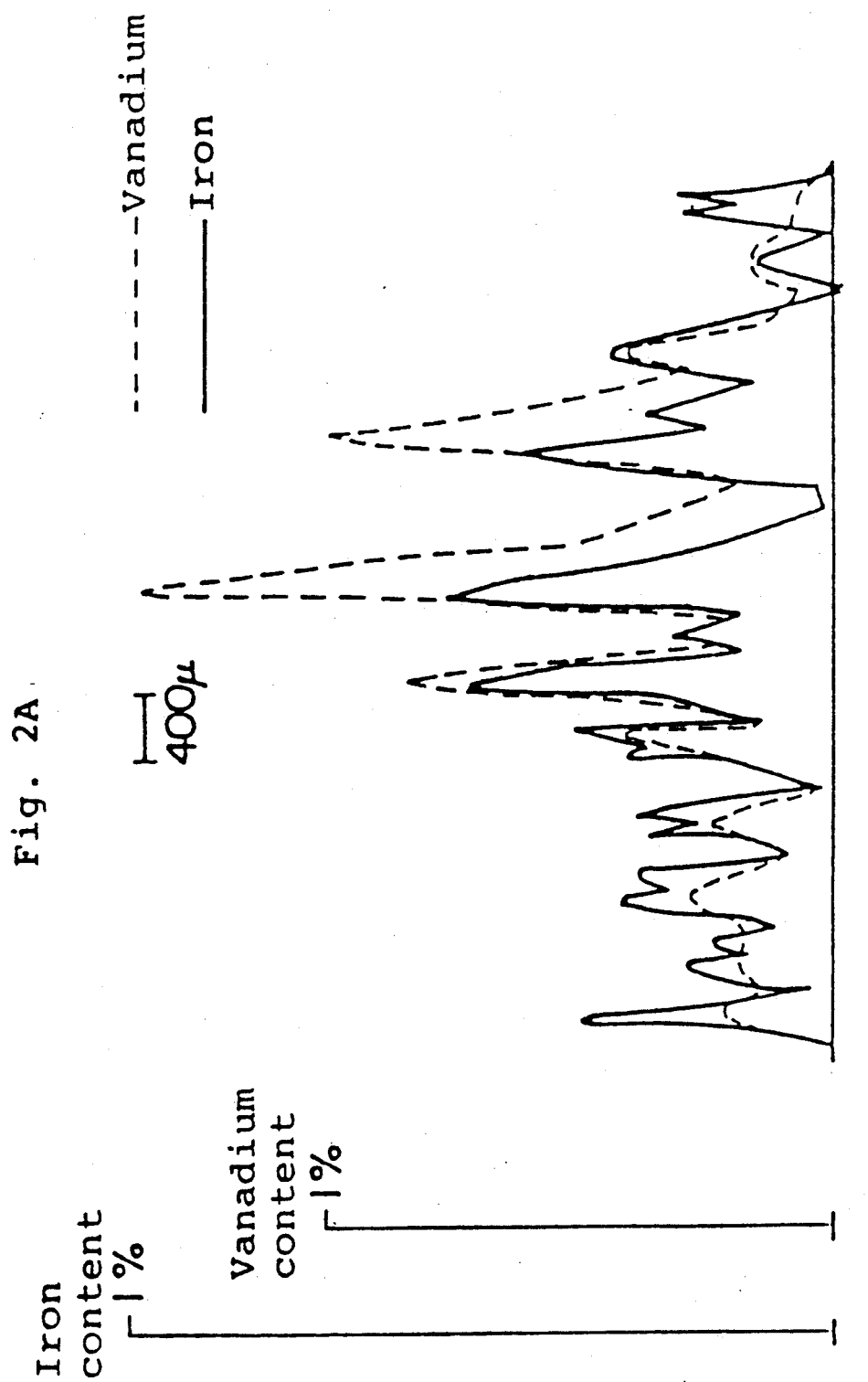

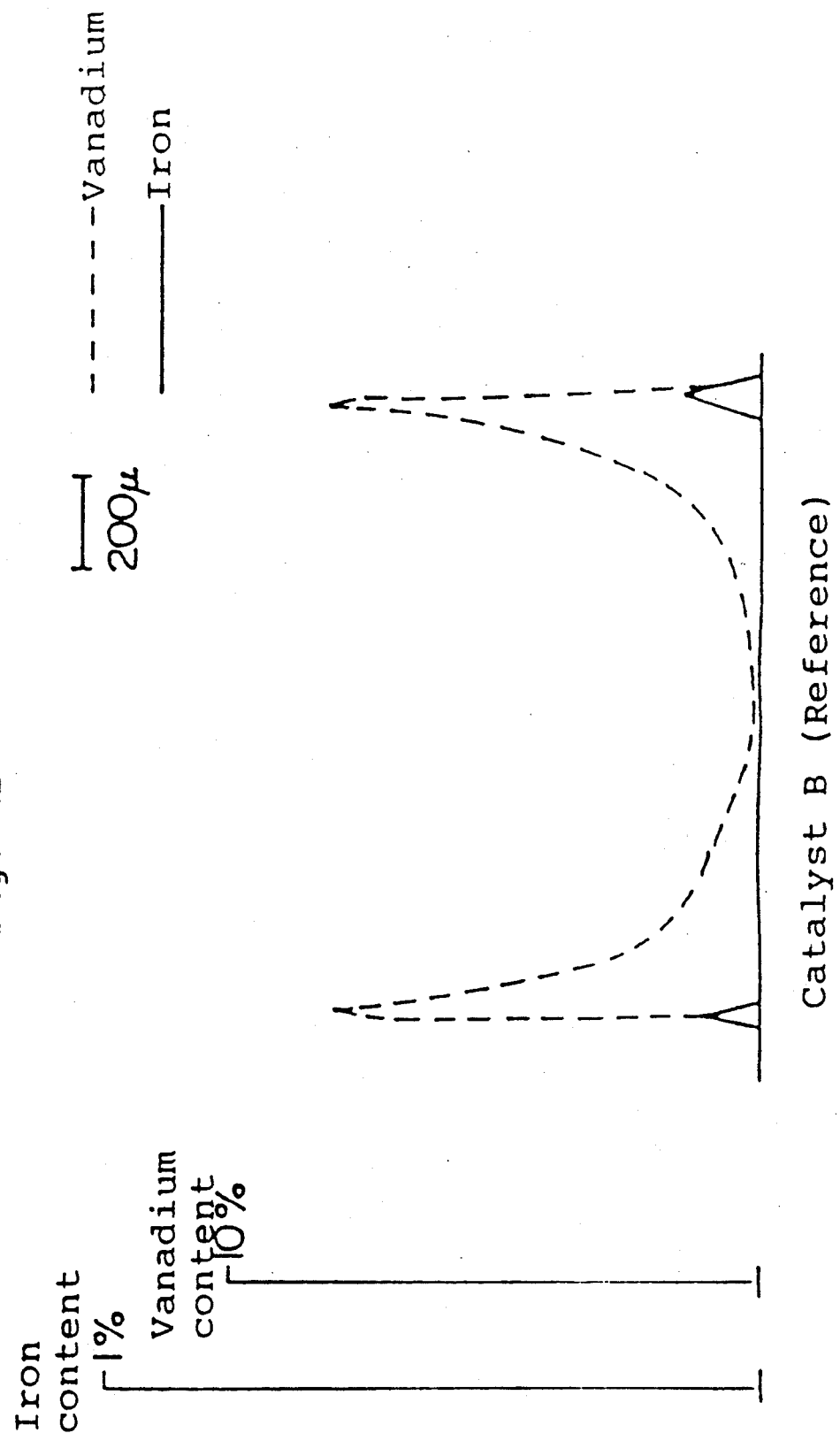

HYDROTREATMENT PROCESS

BACKGROUND OF THE INVENTION

This invention relates to a process for hydrotreating a hydrocarbon oil, more particularly to a process for hydrotreating or hydrofining a hydrocarbon oil contaminated with suspended solid materials and dissolved metallic compounds, such as petroleum oils, tar sand oils, shale oils, etc.

In the hydrotreatment of hydrocarbon oils, such as petroleum oils, tar sand oils, shale oils, etc., extensive use has been made of fixed bed reactors. The continuous operation of these reactors is often governed by such factors as the life of the catalyst packed in the reactor and the difference in pressure at the inlet and the outlet of the reactor (pressure drop).

The pressure drop in a reactor is attributable to various causes, one of which is a suspended solid material, more particularly a metallic suspended material such as scale contained in feedstocks, being deposited on the packed particles, causing blocking of a void and inhibition of the flow of oil and gas and so leading to pressure drop. In general, suspended solid materials present in feedstocks associated with petroleum refining include those originally contained in crude oils, precipitates formed during storage of oils in a tank, scalped scales in piping, etc. They can usually be removed with a backwash filter having a mesh opening of about 25 microns prior to the introduction of the oils into a reactor. However, not all reactors are equipped with such filters. Furthermore, even if a backwash filter is used, suspended solid materials of less than 25 microns in size present in feedstocks as well as scales formed subsequently in pipes, heat exchangers, heating furnaces, and the like will be fed to the reactor and deposited on the packed particles, thus generating a pressure drop.

Alternatively, pressure drop may be caused by the plugging of the packed particles with a reaction material. Such reaction materials may include gum substances formed from unsaturated compounds and also compounds containing iron, vanadium, nickel, carbon, sodium, and the like, which are precipitated and deposited on the packed particles during the hydrotreatment process. Various steps have been taken to prevent pressure drop, depending on the causes thereof.

Where suspended solid materials, such as fine particles of scale contained in feedstock, are the cause, widespread use has been made of a method whereby a graded guard bed capable of trapping these solid materials is provided on the inlet side of the reactor. More particularly, British Patent Application No. 2,108,003 discloses a packed bed reactor comprising: (a) a first guard bed which extends at least 7.62 cm in the direction of flow and contains particles having a diameter of at least 0.95 cm, (b) a second guard bed which extends at least 25.4 cm in the direction of flow and contains particles having a diameter within the range of from 0.48 to 0.79 cm, and (c) a bed containing particles having a diameter of less than 0.32 cm. There is a method of preventing pressure drop caused by organometallic compounds of vanadium, nickel, etc. by packing a demetallization catalyst in a packed bed front, incorporating the metal compounds into the pores of that catalyst, and preventing a deposition of the metals onto the subsequent hydrogenation catalyst particles until the demetallization catalyst is deactivated. However, a drawback to this method is that because of the high reactivity of the dissolved iron compound it is attended with preferred deposition on the exterior surfaces of the demetallization catalyst, thus plugging the inlet of the catalyst pores and so leading to a rapid loss of catalyst activity. Further, the iron, vanadium, nickel, etc. compounds deposited on the exterior surfaces of the demetallization catalyst bring about coalescence of the catalyst particles, causing undesired depositions on the subsequent hydrogenation catalyst particles as well as interstitial plugging of the catalyst beds, which results in pressure drop. Several methods have been proposed to prevent the plugging of catalyst beds by such metal, e.g. iron, compounds, e.g. ever increasing the catalyst particle size to the upstream side to widen the interstices between adjacent catalyst particles in a manner similar to that mentioned above in connection with suspended solid materials. Another method involves gradually increasing the catalyst activity from zone to zone, as disclosed in British Patent Application No. 1,298,905.

Japanese Patent LOP Publication No. 89793/1987 (published on April 24, 1987) discloses a hydrotreating process in which a catalyst containing 0.2 to 3 wt. % of a metal oxide, supported on a porous inorganic carrier, and having a pore volume of 0.4 to 1.5 ml/g and a catalyst bed void fraction of more than 55%, is packed in a reactor in an amount of 1 to 5%, calculated on the total amount of catalyst. For the purpose of removing organic iron compounds U.S. Pat. No. 3,947,347 discloses porous inert particles having an average pore diameter in the range of from 1000 to 10 000 Å and a surface area in the range of from 1 to 20 m$^2$/g.

U.S. Pat. No. 4,510,263 discloses a wheel-shaped catalyst to increase voids, thus preventing catalyst beds from being plugged even when suspended solid materials are deposited on the catalyst particles.

In general, both suspended solid materials such as scales, etc. and dissolved metallic compounds are to be found in hydrocarbon oils such as petroleum oils, etc., especially in heavy-duty oils. The prior art processes will give satisfactory removal of one of these contaminants, but not of the two.

SUMMARY OF THE INVENTION

The primary objective of the present invention to provide a hydrotreatment process for the efficient removal of both suspended solid materials and dissolved metallic compounds from hydrocarbon oils containing same.

The invention relates to a process for hydrotreating a hydrocarbon oil contaminated with suspended solid materials and dissolved metallic compounds, comprising the contacting of the oil at an elevated temperature in the presence of hydrogen with porous inorganic oxide particles having a surface area of 1 m$^2$/g or less and a pore volume of at least 0.1 ml/g in pores having a diameter of at least 10 microns.

DETAILED DESCRIPTION OF THE INVENTION

The surface area, pore size distribution, and pore volume of the particles employed in the process of the present invention can be readily measured by the mercury intrusion method and calculated. As said above, the particles employed must have a surface area of 1 m$^2$/g or less, preferably of 0.01 to 0.7 m$^2$/g, and a pore volume of at least 0.1 ml/g, preferably of at least 0.15 ml/g, in pores having a diameter of at least 10 microns.

The maximum pore diameter will generally be 1000 microns, preferably 200 microns. The pore volume can also be identified by the water absorption capacity as measured by a technique defined in JIS R2205. The water absorption capacity is from about 10 to 70 wt. %.

The shape of the particles employed is not critical and may take the form of spheres, hollow tubes, wheels, quadrulobes, etc. Preferably, the particle size is such that the greatest dimension ranges from 1 mm to 5 cm. The particles employed have a small surface area and are extra macropore. Therefore, it is presumed that most if not all of the scale and deposited metal will be incorporated into their interior. Consequently, with little or no metal deposits ending up on the exterior surfaces of the particles coalescence of the particles leading to pressure drop will not readily occur. Depending on the nature of the feed it may be desirable or not for the porous particles to be previously provided with one or more catalytically active metals. For instance, when the principal concern is to remove suspended solid particles, catalytically active metals may be dispensed with, since the porous particles, in particular alumina, will still effect at least partial demetallization (i.e., removal of dissolved metallic compounds) in the absence of catalytically active metals. In general, however, and in particular if the feed contains dissolved iron compounds, it will be advantageous to provide the porous particles with catalytically active metals. This embodiment is especially preferred for the hydrotreatment of unsaturated components-rich hydrocarbon oils, since, because of their mild hydrogenation activity, it is assumed that the catalytically active metals cause at least partial hydrogenation of said unsaturated components, thus precluding rapid gum and/or coke forming reactions.

Porous inorganic oxide particles to be used in the process according to the invention include alumina, silica, silica-alumina, silica-magnesia, magnesia, titania, etc. which are commercially available, e.g. SA 5218, 5239, and 5205 ex Norton Company and AL-S73 ex Fujimi Corporation, Japan. Preference is given to alumina particles.

Suitable analytically active metals are those which are commonly used for hydrotreating catalysts. They include the metals of Groups VB, VIB, and VIII, such as V, Mo, W, Co, Ni, and Fe.

Applying active metals to the porous inorganic oxide particles may be by means of any known method, for instance by spray impregnation of the porous inorganic oxide particles with a solution of nickel nitrate and ammonium molybdate dissolved in ammonia. The impregnated particles are dried for 1 to 10 hours at 80° to 150° C. and calcined in a rotary kiln for 0.5 to 6 hours at 450° to 700° C. to convert the metal salts into the oxide form. The particles are subjected to a sulfiding treatment prior to being used to convert the metals into the sulfided form. The amount of supported active metals ranges from 0.1 to 5 wt. %, based on the finished particles and calculated as oxides. In actual practice it is difficult to employ more than 5 wt. % of the supported active metals, since the surface area of the oxide particles is 1 $m^2/g$ or less.

As stated above, it will often be advantageous to employ porous particles which have previously been provided with catalytically active metals, in particular when feeds containing dissolved iron compounds are treated according to the process of the invention. However, if it is possible to have low demetallization activity at the initial process stage, it is quite feasible to start out with the present porous particles per se and allow metal components originating from the metal compounds dissolved in the feed to be deposited thereon, thus letting the hydrogenation and the demetallization activity in the particles thus formed build up with time. For such an embodiment heavy feeds containing dissolved iron compounds in combination or not with dissolved vanadium compounds are most preferred.

Conventional hydrotreatment conditions are employed in the process of the present invention, e.g. a reaction temperature of 250° to 500° C., a total pressure of 2 to 250 $kg/cm^2$, a hydrogen pressure of 2 to 200 $kg/cm^2$, and a hydrogen/feed oil ratio of 1 to 2000 Nl/l.

When the sole concern is to remove suspended solid materials and dissolved metallic compounds from the feed, the reactor may be loaded with the presently described porous particles only.

Further, the porous particles may be used in conjunction with conventional hydrotreating catalysts, such as hydrodemetallization, hydroconversion, hydrodesulfurization, and/or hydrodenitrogenation catalysts. In the practice of this embodiment the porous particles may be packed as a guard bed at the inlet side of the reactor, i.e. upstream of the conventional hydrotreating catalyst, and replace, at least in part, hitherto used materials such as alumina balls. The amount of such a guard bed will in general be in the range of from 0.1 to 20% by volume, preferably of from 0.1 to 5% by volume, based on the volume of the reactor. The exact amount will normally depend on the nature of the feed, more particularly on its content of suspended solid materials and dissolved metallic compounds. It goes without saying that, when used in too great an amount, the porous particles may impair overall process efficiency, since the hydrotreatment activity they display, if any, is far lower by comparison than that of the conventional hydrotreating catalysts with which they are used in conjunction.

The skilled man will readily appreciate that in reactors operating with two or more beds of conventional hydrotreating catalysts the present porous particles may also be employed in the zones separating said two or more beds of conventional hydrotreating catalysts.

Among the many advantages of the process according to the invention are:
(i) Efficient removal of suspended solid materials originally present in the feed.
(ii) Efficient removal also of suspended solid materials passed through when a backwash filter is used.
(iii) Efficient removal of scale (e.g. iron and carbon scales) generated in pipes and heat exchangers.
(iv) A controlled rate of demetallization due to the surface area of the porous particles not exceeding 1 $m^2/g$. As a result, plugging of the pores is avoided and activity maintained over long periods of time.
(v) Coalescence of the porous particles occurs hardly if at all, as a result of which problems such as maldistribution of the oil flow and pressure drop are avoided over long periods of time.

The invention will be further illustrated by the following examples, in which the water absorption capacity was measured in accordance with a method for the determination of apparent porosity-water absorption capacity and specific gravity of refractory brick as defined by JIS R2205. Pore size distribution was measured using the mercury intrusion method. To this end an Autopore 9200 apparatus of Micrometrics Co., Ltd. was used, employing a mercury surface tension of 480 dyne/cm at 25° C. and a contact angle of 140°. The pore diameter range measurable by this apparatus is from about 4 nm to about 300 microns, the surface area being calculated from the data obtained by the mercury intrusion method.

In the examples reference will be made to the following drawings in which:

FIG. 2A is a graph illustrating the distribution, as determined by X-ray microanalysis, of vanadium and iron on the cross-section of a spent porous particle used according to the process of the invention (catalyst A);

FIG. 2B is a graph illustrating the distribution, as determined by X-ray microanalysis, of vanadium and iron on the cross-section of catalyst B, which is a catalyst outside the invention's scope.

EXAMPLE 1

Figure 1:
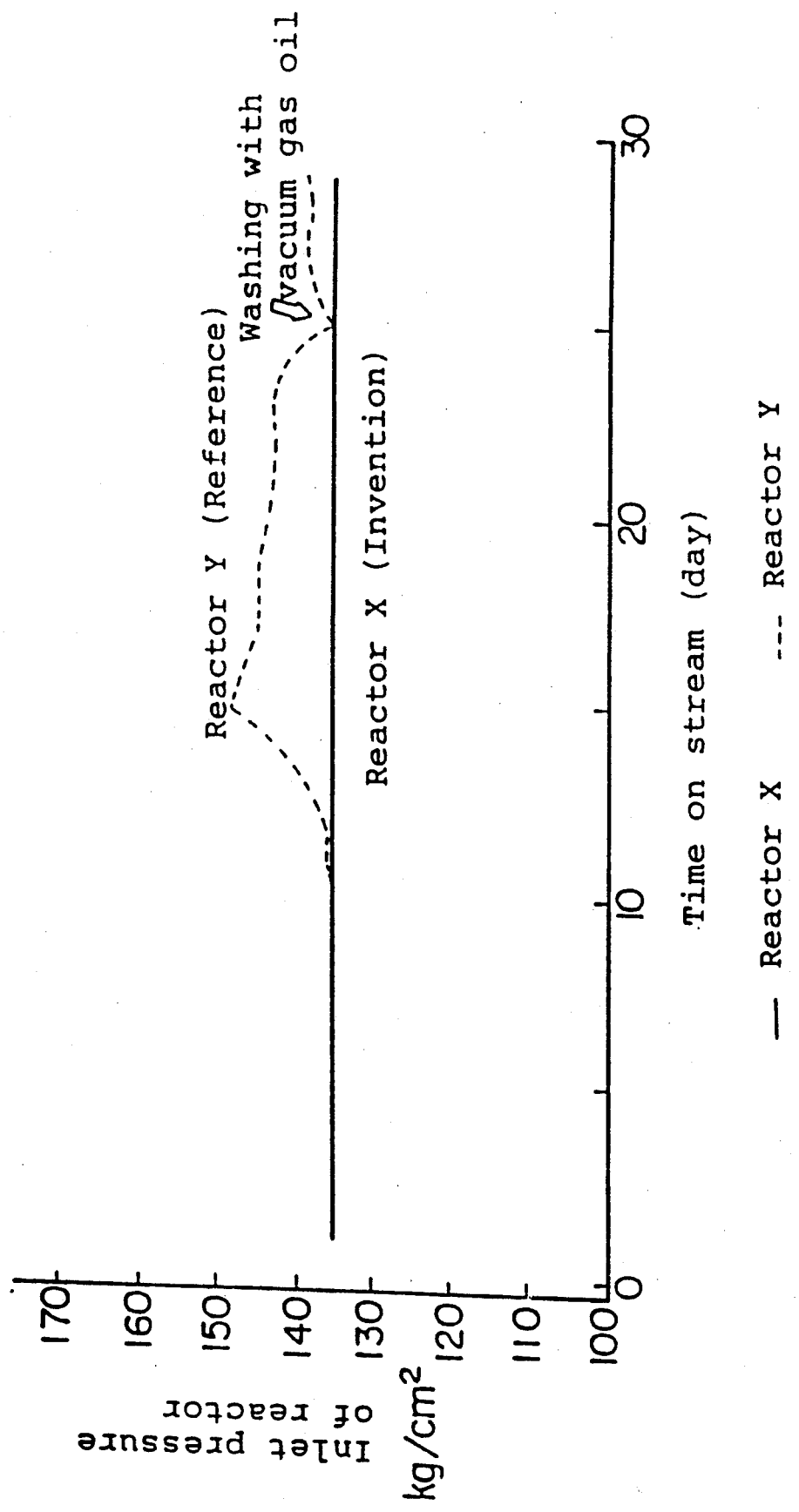
FIG. 1 is a graph illustrating the change in pressure at the inlet of the reactor relative to the time on stream.

To support 1.0% by weight of molybdenum oxide ($MoO_3$) and 0.5% by weight of nickel oxide (NiO) on porous alumina beads (diameter of 5 mm; Bead AL-S73 of Fujimi Corporation) 10.2 g of molybdenum trioxide and 20.0 g of nickel nitrate hexahydrate were dissolved in 31 cm$^3$ of 25% aqueous ammonia to make up an impregnation solution of which the volume had been adjusted with water to make it correspond to the water absorption capacity of the carrier. One kg of the carrier was impregnated with the impregnation solution. The material was allowed to stand for 30 minutes, after which it was dried for 3 hours at 120° C. Next, the dried material was calcined in a rotary kiln for 2 hours at 500° C. to prepare Catalyst A having a surface area of 0.39 m$^2$/g, a water absorption capacity of 30.8%, and a pore volume of 0.21 ml/g in pores with a pore diameter of at least 10 microns. Microscopic observation of the exterior surface of the particles indicated that the maximum pore diameter of the catalyst was about 400 to 500 microns.

EXAMPLE 2

Pressure drop was investigated for Catalyst A of Example 1 and a commercial Catalyst B, use being made of an atmospheric residual oil. The commercial Catalyst B (KFR-30 of Nippon Ketjen Co., Ltd.) was a hydrodesulfurizing and demetallizing catalyst for residual oil and is outside the scope of the present invention. It contained 8.9% by weight of $MoO_3$ and 2.3% by weight of NiO and had a surface area of 191 m$^2$/g, a water absorption capacity of 71.0%, and a pore volume of not more than 0.01 ml/g in pores with a pore diameter of at least 10 microns, as determined by the mercury intrusion method. In Reactors X and Y, which have an inner diameter of 2 cm, were packed 100 ml of the commercial Catalyst B each. In the upper portion (the inlet side for feedstock oils) of Reactor X were packed 5 ml of Catalyst A to be used according to the process of the present invention, in that of Reactor Y were packed, for comparative purposes, 5 ml of alumina balls free of pores and having a diameter of 5 mm. The total volume of Catalyst A in Reactor X was 4.7%.

The catalysts were then presulfided by being contacted with a light gas oil (LGO), which was spiked with 2.5% by weight of dimethyl disulfide (DMDS), under the following conditions: a hydrogen/oil ratio of 1000 NL/l, an LHSV (liquid hourly space velocity) of 1.0 hr$^{-1}$, and a hydrogen pressure of 135 kg/cm$^2$, with the temperature being increased from 250° to 320° C. over a period of 14 hours. The feedstock was then switched to Iranian heavy atmospheric residual oil, the properties of which are listed below:

| | | |
|---|---|---|
| density | 1.0002 | g/ml |
| viscosity at 50° C. | 13050 | cSt |
| sulfur | 3.49 | wt. % |
| carbon | 84.36 | wt. % |
| hydrogen | 10.86 | wt. % |
| vanadium | 215 | ppm |
| nickel | 68 | ppm |
| iron | 11 | ppm |
| carbon residue (CCR) | 15 | wt. % |

The feed gas used was pure hydrogen and the reaction conditions were as follows:

| | |
|---|---|
| pressure: | 135 kg/cm$^2$ |
| LHSV: | 0.8 hr$^{-1}$ |
| hydrogen/oil ratio: | 700 Nl/l |
| reaction temperature: the temperature was increased from 385° to 420° C. over a period of 8 days and subsequently maintained at 420° C. | |

The operation was such that, when pressure drop occurred, the inlet pressure was increased to maintain the outlet pressure of the reactor at 135 kg/cm$^2$. Catalyst activity and pressure drop observed at 10, 15, and 26 days on stream are given in Table 1; the change in inlet pressure is shown in FIG. 1. The product oils were found to have an iron concentration of less than 1 ppm, which is the detection limit using the fluorescence X-ray method. In the reference Reactor Y increased pressure drop was observed from 13 days on stream onward. At 25 days on stream a vacuum gas oil was then passed through the reactor to wash the packed material. Thus the pressure drop at 25 days on stream was found to be lower than that of the previous day.

TABLE 1

| | Time on stream (days) | | | | | |
|---|---|---|---|---|---|---|
| | 10 | | 15 | | 26 | |
| | Reactor | | | | | |
| | X | Y | X | Y | X | Y |
| Reaction temperature (°C.) | 420 | 420 | 420 | 420 | 420 | 420 |
| LHSV (hr$^{-1}$) | 0.806 | 0.801 | 0.807 | 0.801 | 0.806 | 0.801 |
| Inlet pressure (kg/cm$^2$) | 135 | 135 | 135 | 148 | 135 | 138 |
| Outlet pressure (kg/cm$^2$) | 135 | 135 | 135 | 135 | 135 | 135 |
| Pressure drop (kg/cm$^2$) | 0 | 0 | 0 | 13 | 0 | 3 |
| % Desulfurization | 89 | 88 | 85 | 86 | 83 | 83 |
| % Demetallization* | 88 | 89 | 85 | 85 | 82 | 83 |

*Demetallization was calculated on the basis of the analytical values of nickel and vanadium.

As is shown in Table 1 and FIG. 1, Reactor X, which contained Catalyst A according to the process of the present invention could be operated without pressure drop for 29 days, unlike the reference Reactor Y, which contained prior art alumina balls.

On withdrawal of the spent catalysts from the two reactors on completion of the run no solidification of the catalyst was observed in Reactor X, whereas the catalyst at the upper portion of the reference reactor had solidified slightly. The distribution of vanadium and iron in spent Catalyst A from Reactor X and spent Catalyst B from Reactor Y was investigated by X-ray microanalysis, the results being shown in FIGS. 2A-2B.

With regard to commercial Catalyst B it was found that iron had deposited on the exterior surface of the particles and to depths of about 100 microns from the surface. In Catalyst A used according to the process of the present invention the iron-containing compounds were found to have diffused and to have deposited as deep down as the particle center. The concentration of iron deposited on Catalyst A also was higher than that on Catalyst B. As shown in FIG. 1, washing of Reactor Y with a vacuum gas oil after 25 days resulted in a temporary reduction in pressure drop. However, immediately afterwards pressure drop again manifested itself. It is suspected that such pressure drop is caused by highly condensed hydrocarbon compounds, which could be washed out with a vacuum gas oil, and also by metal sulfides that could not be washed out, such as iron sulfide deposited on the particles, and scales.

EXAMPLE 3

An extruded and calcined alumina carrier was pulverized to alumina dust (fine powder). The particle size distribution of the alumina dust determined using a Laser Micronsizer 7000 S of Seishin Enterprise was as follows: less than 192 microns: 100%; less than 96 microns: 71%; less than 64 microns: 46%; and less than 16 microns: 9.1%; with an average particle diameter of 70 microns. 100 g of the dust were suspended in 2.5 l of water.

A wire mesh was arranged on a tripod and on it was placed a pipe having an inside diameter of 10 cm and a length of 30 cm. The pipe was packed with 2 l (2245 g) of AL-S73 beads (3 mm in diameter. Fujimi Corporation) dried at 500° C. The beads had a surface area of 0.39 m$^2$/g, a water absorption capacity of 31%, and a pore volume of 0.20 ml/g in pores with a pore diameter of at least 10 microns. The above described suspension of 100 g of alumina dust in 2.5 l of water was poured through the pipe. After having been allowed to stand for one hour, the contents of the pipe were transferred to a previously weighed stainless steel tray. After the pipe's contents had been dried at 500° C., the weight gain was determined to be 76.1 g.

For comparison the experiment was repeated, except that the pipe was packed with 2 l (1636 g) of non-porous alumina beads of 3 mm diameter. After drying the weight gain was found to be 9.3 g.

The process according to the present invention makes it possible for suspended solids to be trapped to a degree several times higher than allowed by prior art processes.

EXAMPLE 4

In similar manner to that described in Example 1 1.0% by weight of MoO$_3$ and 0.5% by weight of NiO were supported on 1 kg of AL-S73 (3 mm alumina beads of Fujimi Corporation) to prepare Catalyst C. This catalyst had a surface area of 0.39 m$^2$/g, a pore volume of 0.20 ml/g in pores with a pore diameter of at least 10 microns, and a water absorption capacity of 31.0%. 20 ml of Catalyst C were packed in the lower portion of a reactor (2 cm in diameter) in an activity testing unit, 20 ml of Catalyst A of Example 1 being packed in the upper portion. For comparison there were packed in another reactor (2 cm in diameter) 40 ml of a ⅛", quadrulobed commercial Catalyst D (AS-20. Nippon Ketjen Co., Ltd.), which is a prior art catalyst specifically recommended to prevent pressure drop. Catalyst D contained 6.0 wt. % of MoO$_3$, 0.3 wt. % of NiO, and 0.8 wt. % of CoO, had a surface area of 245 m$^2$/g, a water absorption capacity of 66.3%, a pore volume of not more than 0.01 ml/g in pores with a pore diameter of at least 10 microns as determined by the mercury intrusion method, and a pore volume of 0.58 ml/g in pores with a pore diameter greater than 2 nm. The catalysts of the present invention (Catalysts A and C) and the reference catalyst (Catalyst D) were then presulfided by being contacted with a light gas oil (LGO), which was spiked with 2.5 wt. % of dimethyl disulfide (DMDS), under the following conditions: a hydrogen/oil ratio of 160 Nl/l, an LHSV of 1.33 hr$^{-1}$, a hydrogen pressure at the inlet of 30 kg/cm$^2$, the temperature being raised from 250° to 320° C. over a period of 14 hours. The feedstock was then switched to Arabian medium atmospheric residual oil. Iron (11) naphthenate was added to the feedstock oil to increase the iron concentration from 5.5 ppm to 295 ppm to permit investigation of the iron removal activity. The properties of the feedstock oil after the iron naphthenate addition are given below:

| | | |
|---|---|---|
| density | 0.9918 | g/ml |
| viscosity at 50° C. | 3085 | cSt |
| sulfur | 4.21 | wt. % |
| nitrogen | 2485 | ppm |
| vanadium | 83 | ppm |
| nickel | 26 | ppm |
| iron | 295 | ppm |
| carbon residue | 13.8 | wt. % |

The test was carried out under the following conditions:

| | |
|---|---|
| LHSV: | 3 hr$^{-1}$ |
| hydrogen/oil ratio: | 700 Nl/l |
| Kept at the following reaction temperatures: 32 hours at 300° C., followed by 32 h at 320° C. and a further 32 h at 340° C. | |

The iron concentration of the product oil, the demetallization percentage, and the relative reaction rate constants at the respective temperatures assuming second order reaction are shown in Table 2.

As is shown in Table 2, the catalysts are used according to the process of the present invention displayed substantially equal or higher activity than the prior art catalyst with regard to iron removal. Analysis of the spent catalysts by X-ray microanalysis indicated that iron was deposited as deep down as the center portion of the particles in the case of the Catalysts A and C, whereas no iron was present in the center portion of the particles in the case of reference catalyst D.

TABLE 2

| Time on stream (h) | Recreation Temperature (°C.) | Iron Concentration (ppm) | | Iron Removal (%) | | Relative Rate Constants | |
|---|---|---|---|---|---|---|---|
| | | Catalysts C & A | Reference Catalyst D | Catalysts C & A | Reference Catalyst D | Catalysts C & A | Reference Catalyst D |
| 32 | 300 | 41 | 47 | 86.1 | 84.1 | 1.17 | 1 |
| 64 | 320 | 22 | 33 | 92.5 | 88.8 | 1.56 | 1 |

TABLE 2-continued

| Time on stream (h) | Recreation Temperature (°C.) | Iron Concentration (ppm) | | Iron Removal (%) | | Relative Rate Constants | |
|---|---|---|---|---|---|---|---|
| | | Catalysts C & A | Reference Catalyst D | Catalysts C & A | Reference Catalyst D | Catalysts C & A | Reference Catalyst D |
| 96 | 340 | 17 | 27 | 94.2 | 90.8 | 1.65 | 1 |

We claim:

1. A process for hydrotreating to remove contaminants from a hydrocarbon oil contaminated with at least one of suspended solid materials and dissolved metallic compounds, comprising the contacting of oil, at an elevated temperature in the presence of hydrogen, with porous inorganic oxide particles having a surface area of 1 $m^2/g$ or less and a pore volume of at least 0.1 ml/g in pores having a diameter of at least 10 microns.

2. The process of claim 1 wherein the porous inorganic oxide particles contain oxides or sulfides of metals selected from the group consisting of Groups VA, VIB, and VIII of the Periodic Table.

3. The process of claim 1 wherein the surface area of said particles is in the range of from about 0.01 to about 0.7 $m^2/g$.

4. The process of claim 1 wherein said pore volume is 0.15 ml/g.

5. The process of claim 1 wherein said pore diameter is less than about 1000 microns.

6. The process of claim 1 wherein said inorganic oxide is selected from the group consisting of alumina, silica, silica-alumina, magnesia, silica-magnesia and titania.

7. The process of claim 6 wherein said inorganic oxide comprises alumina.

8. The process of claim 1 wherein said hydrocarbon oil is contaminated with both suspended solid particles and dissolved metallic compounds.

9. The process of claim 2 wherein said metals are selected from Group VB.

10. A process for hydrotreating a hydrocarbon oil contaminated with suspended solid particles and dissolved metallic compounds to remove such contaminants, comprising the contacting of the oil, at an elevated temperature in the presence of hydrogen, with porous inorganic oxide particles comprising alumina and having a surface area of 1 $m^2/g$ or less and a pore volume of at least 0.1 ml/g in pores having a diameter ranging from 10 to 200 microns, wherein said particles also contain oxides or sulfides of at least one metal selected from the group consisting of Groups VB, VIB and VIII of the Periodic Table.

11. The process of claim 10 wherein oxides or sulfides of Mo and Ni are present.

* * * * *

UNITED STATES PATENT AND TRADEMARK OFFICE
CERTIFICATE OF CORRECTION

PATENT NO. : 5,217,603
DATED : June 8, 1993
INVENTOR(S) : INOUE et al.

It is certified that error appears in the above—identified patent and that said Letters Patent is hereby corrected as shown below:

Column 8, line 52, delete "are" after "catalysts";

Column 9, line 21, please change "VA" to --VB--.

Signed and Sealed this

Fifteenth Day of March, 1994

*Attest:*

BRUCE LEHMAN

*Attesting Officer*   *Commissioner of Patents and Trademarks*